(12) United States Patent
Turner

(10) Patent No.: US 12,050,604 B2
(45) Date of Patent: *Jul. 30, 2024

(54) NORMALIZATION AND EXTRACTION OF LOG DATA

(71) Applicant: ThreatSTOP, Inc., Carlsbad, CA (US)

(72) Inventor: Francis Turner, Carlsbad, CA (US)

(73) Assignee: ThreatSTOP, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/354,499

(22) Filed: Jun. 22, 2021

(65) Prior Publication Data

US 2022/0012237 A1 Jan. 13, 2022

Related U.S. Application Data

(63) Continuation of application No. 16/365,671, filed on Mar. 26, 2019, now Pat. No. 11,042,546, which is a continuation of application No. 14/872,897, filed on Oct. 1, 2015, now Pat. No. 10,242,062.

(60) Provisional application No. 62/119,062, filed on Feb. 20, 2015.

(51) Int. Cl.
*G06F 16/00* (2019.01)
*G06F 16/2455* (2019.01)
*G06F 40/205* (2020.01)
*H04L 9/40* (2022.01)

(52) U.S. Cl.
CPC ........ *G06F 16/2455* (2019.01); *G06F 40/205* (2020.01); *H04L 63/1425* (2013.01)

(58) Field of Classification Search
None
See application file for complete search history.

(56) References Cited

U.S. PATENT DOCUMENTS

| | | |
|---|---|---|
| 5,987,606 A | 11/1999 | Cirasole et al. |
| 6,574,737 B1 | 6/2003 | Kingsford et al. |
| 6,769,031 B1 | 7/2004 | Bero |
| 6,920,116 B1 | 7/2005 | Hossain et al. |
| 6,973,488 B1 | 12/2005 | Yavatkar et al. |
| 7,095,738 B1 | 8/2006 | Desanti |
| 7,389,532 B2 | 6/2008 | Swander |
| 7,451,488 B2 | 11/2008 | Cooper et al. |
| 7,472,421 B2 | 12/2008 | Cummins |
| 7,478,427 B2 | 1/2009 | Mukherjee et al. |
| 7,496,662 B1 | 2/2009 | Roesch et al. |
| 7,574,508 B1 | 8/2009 | Kommula |

(Continued)

OTHER PUBLICATIONS

International Application No. PCT/US2007/076686, International Search Report and Written Opinion mailed Mar. 10, 2008.

(Continued)

*Primary Examiner* — Anhtai V Tran
(74) *Attorney, Agent, or Firm* — Ahmann Kloke LLP

(57) ABSTRACT

Extracting data from traffic logs using regular expressions. A traffic log is received from a network device. A characterization of an extraction of data from the traffic log is determined. The traffic log is parsed by applying a first regular expression to the traffic log according to the characterization of the extraction of data from the traffic log to generate parsed data. Data is extracted from the traffic log by applying a second regular expression to the parsed data according to the characterization of the extraction of data from the traffic log to generate extracted data.

20 Claims, 9 Drawing Sheets

(56) References Cited

U.S. PATENT DOCUMENTS

| | | |
|---|---|---|
| 7,627,123 B2 | 12/2009 | Conway et al. |
| 7,917,647 B2 | 3/2011 | Cooper et al. |
| 7,937,353 B2 | 5/2011 | Bernoth et al. |
| 8,079,081 B1 | 12/2011 | Lavrik et al. |
| 8,117,339 B2 | 2/2012 | Adelman et al. |
| 8,533,822 B2 | 9/2013 | Byrnes |
| 8,660,969 B1 * | 2/2014 | Hall ................ G06F 40/30 |
| | | 706/45 |
| 8,898,734 B2 | 11/2014 | Singh et al. |
| 9,633,073 B1 * | 4/2017 | Allen ............. G06F 16/2462 |
| 2002/0103903 A1 | 8/2002 | Bruton et al. |
| 2002/0141378 A1 | 10/2002 | Bays et al. |
| 2003/0005157 A1 | 1/2003 | Chung et al. |
| 2003/0028650 A1 | 2/2003 | Chen et al. |
| 2003/0065762 A1 | 4/2003 | Stolorz et al. |
| 2003/0200321 A1 | 10/2003 | Chen et al. |
| 2004/0047349 A1 | 3/2004 | Fujita et al. |
| 2004/0168049 A1 | 8/2004 | Lee |
| 2004/0193709 A1 | 9/2004 | Selvaggi et al. |
| 2004/0268147 A1 | 12/2004 | Wiederin et al. |
| 2005/0021980 A1 | 1/2005 | Kanai |
| 2005/0193103 A1 | 9/2005 | Drabik |
| 2005/0198125 A1 | 9/2005 | Beck et al. |
| 2005/0198299 A1 | 9/2005 | Beck et al. |
| 2005/0204050 A1 | 9/2005 | Turley et al. |
| 2006/0143703 A1 | 6/2006 | Hopen et al. |
| 2006/0235997 A1 | 10/2006 | Munirajan et al. |
| 2006/0242313 A1 | 10/2006 | Le et al. |
| 2007/0078872 A1 | 4/2007 | Cohen |
| 2007/0078936 A1 | 4/2007 | Quinlan et al. |
| 2007/0157288 A1 | 7/2007 | Lim |
| 2007/0234061 A1 | 10/2007 | Teo |
| 2007/0271606 A1 | 11/2007 | Amann et al. |
| 2007/0283028 A1 | 12/2007 | Gilroy et al. |
| 2007/0286214 A1 | 12/2007 | Goel et al. |
| 2009/0031028 A1 | 1/2009 | Kumar et al. |
| 2009/0055929 A1 | 2/2009 | Lee et al. |
| 2009/0276523 A1 * | 11/2009 | Prasad ............... G06F 16/958 |
| | | 709/224 |
| 2010/0077204 A1 | 3/2010 | Kawano |
| 2011/0238801 A1 | 9/2011 | Bahl |
| 2012/0173680 A1 | 7/2012 | Coskun et al. |
| 2014/0007241 A1 | 1/2014 | Gula et al. |
| 2014/0047500 A1 | 2/2014 | Byrnes |
| 2014/0053248 A1 | 2/2014 | Hulusi et al. |
| 2014/0165128 A1 | 6/2014 | Auvenshine et al. |
| 2015/0172294 A1 | 6/2015 | Bittner et al. |
| 2015/0372977 A1 * | 12/2015 | Yin ....................... H04L 63/20 |
| | | 726/1 |
| 2016/0224618 A1 * | 8/2016 | Robichaud ......... G06F 21/6227 |
| 2017/0063896 A1 | 3/2017 | Muddu et al. |

OTHER PUBLICATIONS

International Application No. PCT/US2016/018347, International Search Report and Written Opinion mailed May 3, 2016.
International Application No. PCT/US2016/025389, International Search Report and Written Opinion mailed Jun. 24, 2016.

* cited by examiner

NORMALIZATION AND EXTRACTION OF LOG DATA

CROSS-REFERENCE TO RELATED APPLICATIONS

This application is a continuation application of U.S. patent application Ser. No. 16/365,671, filed Mar. 26, 2019, now U.S. Pat. No. 11,042,546, which is a continuation application of U.S. patent application Ser. No. 14/872,897, filed Oct. 1, 2015, now U.S. Pat. No. 10,242,062, which claims the benefit of U.S. Patent Provisional Application No. 62/119,062, filed Feb. 20, 2015, each of which is hereby incorporated by reference herein.

DETAILED DESCRIPTION

Figure 1:
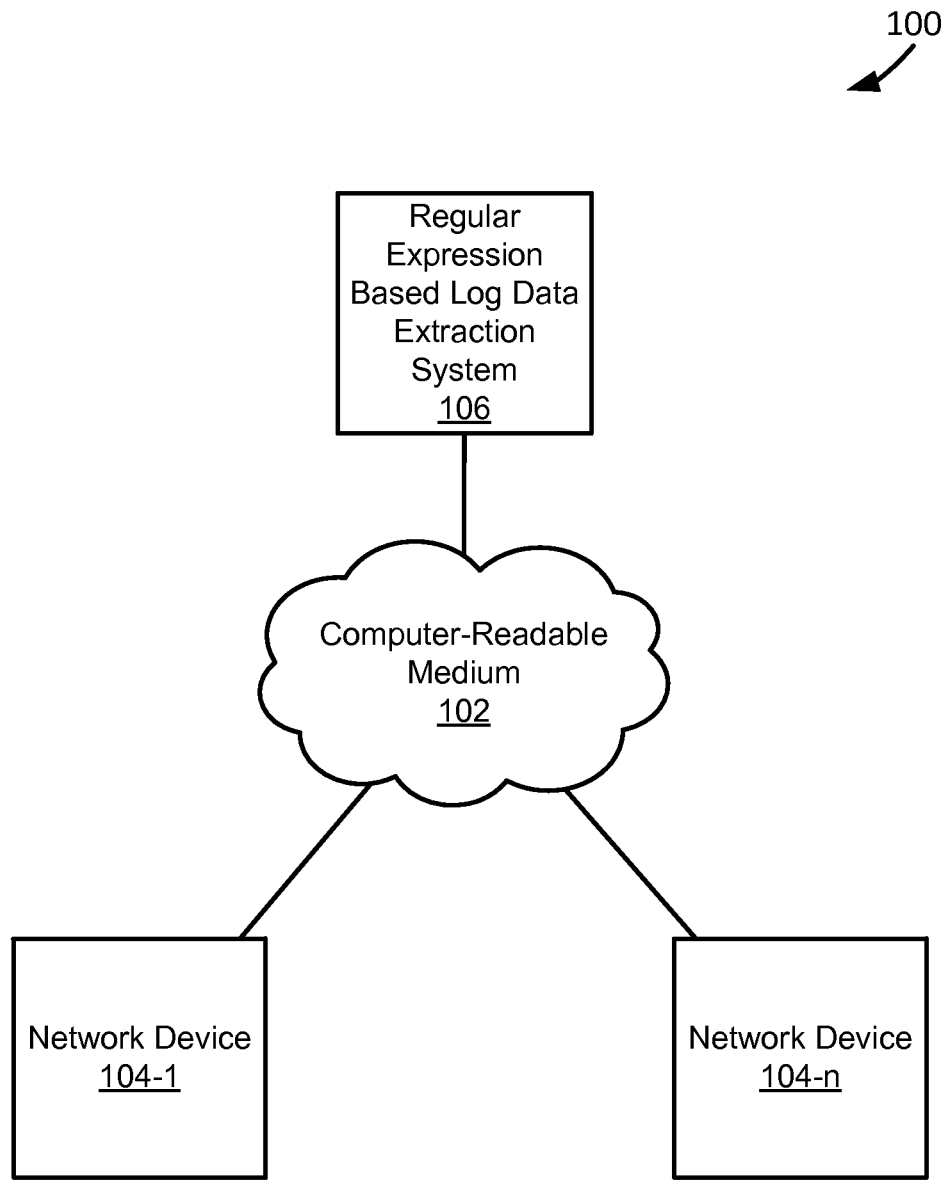
FIG. 1 depicts a diagram of an example of a system for extracting data from a log using regular expressions.

FIG. 1 depicts a diagram 100 of an example of a system for extracting data from a log using regular expressions. The system of the example of FIG. 1 includes a computer-readable medium 102, network device 104-1 to network device 104-n (hereinafter referred to as "network devices 104"), and a regular expression based log data extraction system 106.

The network devices 104 and the regular expression based log data extraction system 106 are coupled to each other through the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102, the network devices 104, the regular expression based log data extraction system 106, and any other applicable systems or devices described in this paper can be implemented as a computer system or parts of a computer system or a plurality of computer systems. A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, Ethernet interface, satellite transmission interface (e.g., "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes at least two components: 1) a dedicated or shared processor and 2) hardware, firmware, and/or software modules that are executed by the processor. Depending upon implementation-specific or other considerations, an engine can be centralized or its functionality distributed. An engine can include special purpose hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

The network devices 104 function according to an applicable device for creating a traffic log of routed data traffic. For example, the network devices 104 can generate logs indicating data that is not routed according to a firewall. Depending upon implementation-specific or other considerations, the network devices 104 can be a router, a switch, an access point, a gateway, including a wireless gateway, a repeater, a firewall, a DNS server, or any combination thereof. In various implementations, the network devices 104 function to route data to and from a backend network. The network devices 104 can function according to applicable protocols for forming part of a wireless network, including WiFi, such as the IEEE 802.11 standards, which are hereby incorporated by reference.

In a specific implementation, the network devices 104 are wirelessly coupled through a Wi-Fi connection to an end user device, which acts as or includes a station. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the network devices 104 are compliant with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

The regular expression based log data extraction system 106 functions to extract data from traffic logs generated by the network devices 104. The regular expression based log data extraction system 106 can extract data from traffic logs generated by the network devices 104 using regular expressions. Regular expression can include a character or a sequence of characters forming a search pattern. A regular expression can include an applicable combination of metacharacters, including quantifiers, and/or regular characters. For example a regular expression can be (?<=\.){2,}(?=[A-Z]), which matches two spaces following a period and before an upper case letter. Regular expressions used by the regular expression based log data extraction system 106 can be in accordance with the IEEE POSIX standard and/or the Perl standard.

In a specific implementation, the regular expression based log data extraction system 106 can collect logs from the network devices 104. In extracting data from collected traffic logs, the regular expression based log data extraction system 106 can use regular expressions to parse a traffic log to create parsed data. Further, in extracting data from collected logs, the regular expression based log data extraction system 106 can apply regular expressions to parsed data from traffic logs in order to extract data from the traffic logs. Depending upon implementation-specific or other considerations, the regular expression base log data extraction system 106 can determine which regular expressions to apply to traffic logs based on a log type, including a format of a traffic log and/or a direction of data traffic represented in a traffic log. Depending upon implementation-specific or other considerations, the regular expression based log data extraction system 106 can create regular expressions for use in extracting data based on one or a combination of: a possibility of increasing the chances that data or relevant data will be extracted, a log type of traffic logs, a direction of data traffic represented in a traffic log, and/or a type of data to be extracted from a traffic log.

In an example of operation of the example system 100 shown in FIG. 1, the network devices 104 generate traffic logs of routed data through a network. In the example of operation of the example system shown in FIG. 1, the regular expression based log data extraction system 106 collects from the network devices 104 generated traffic logs. Further, in the example of operation of the example system shown in FIG. 1, the regular expression based log data extraction system 106 parses the collected traffic logs with at least one regular expression to generate parsed data. In the example of operation of the example system shown in FIG. 1, the regular expression based log data extraction system 106 extracts data from the parsed data by applying at least one regular expression to the parsed data.

Figure 2:
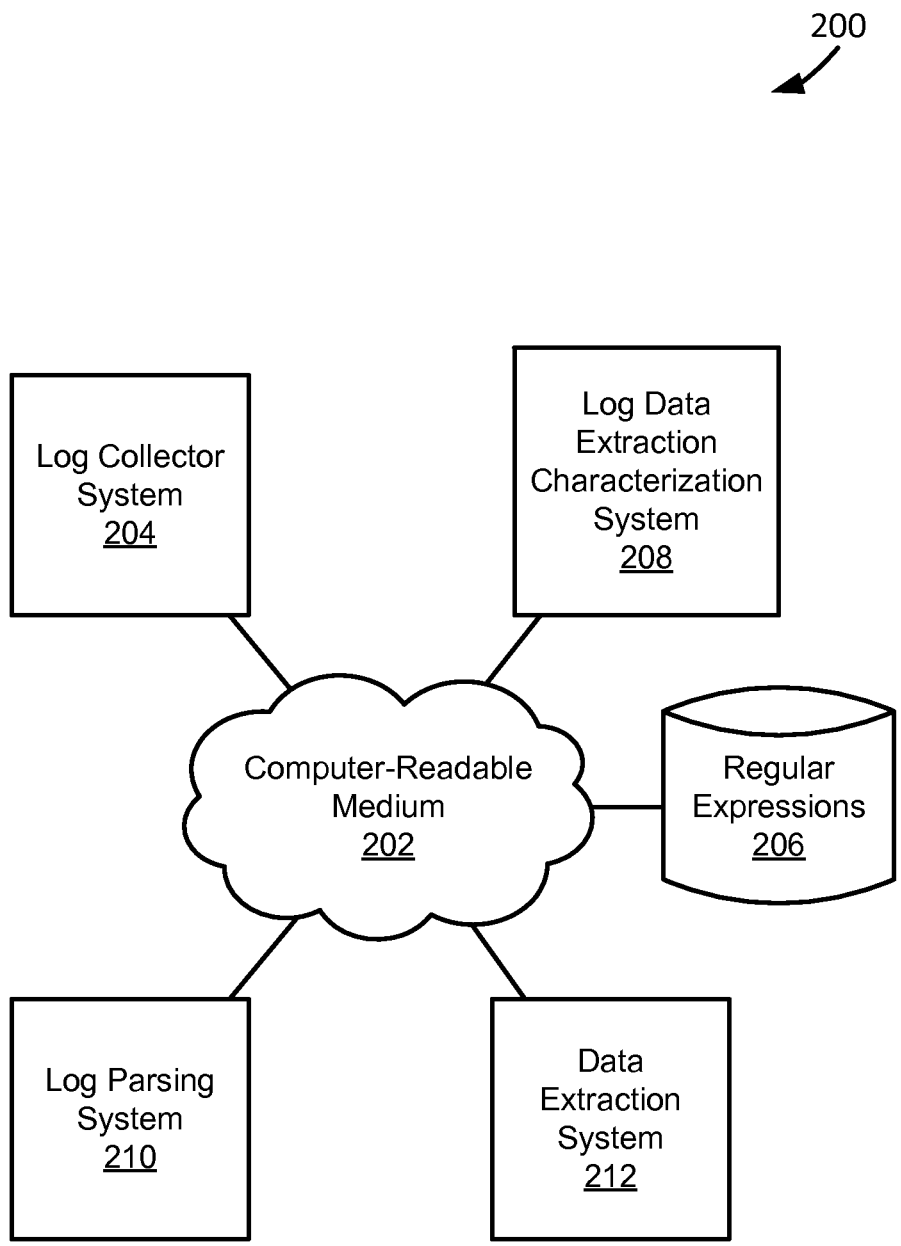
FIG. 2 depicts a diagram of an example of a regular expression based log data extraction system.

FIG. 2 depicts a diagram 200 of an example of a regular expression based log data extraction system. The example system shown in FIG. 2 includes a computer-readable medium 202, a log collector system 204, a regular expressions datastore 206, a log data extraction characterization system 208, a log parsing system 210, and a data extraction system 212. In the example system shown in FIG. 2, the log collector system 204, the regular expressions datastore 206, the log data extraction characterization system 208, the log parsing system 210, and the data extraction system 212 are coupled to each other through the computer-readable medium 202.

The log collector system 204 functions to collect traffic logs from network devices. The log collector system 204 can collect traffic logs by sending a request for a traffic log to a network device, and subsequently receiving the traffic log from the network device in response to the request. Depending upon implementation-specific or other considerations, the log collector system 204 can collect traffic logs after or during an occurrence of a specific event and/or at a specific point time. For example, the log collector system 204 can collect traffic logs from a network device after the network device becomes initially coupled to the log collector system 204. In another example, the log collector system 204 can collect traffic logs from a network device every day at a specific time in the day.

The regular expressions datastore 206 functions to store regular expressions data. Regular expressions data can include a regular expression, an entity responsible for creating a regular expression, log types to apply a specific regular expression to in creating parsed data, parsed data from a traffic log to apply a regular expression to in extracting data, and/or types of data obtained by applying a regular expression to either a traffic log or parsed data. For example, regular expressions data can indicate to apply a specific regular expression to parsed data for extracting destination MAC addresses from the parsed data of a traffic log. In another example, regular expressions data can indicate to apply a specific regular expression to a traffic log to generate parsed data for extracting data indicating all outbound traffic from a network device. In various embodiments, regular expressions data can be originally obtained from a general regular expression library, and be subsequently modified in order to increase an amount of data that is extracted from a traffic log, increase an amount of data that is extracted from a log type of traffic logs, configure a regular expression for extraction of a direction of data traffic represented in a traffic log, and/or increase a specific type of data to be extracted from a traffic log.

The log data extraction characterization system 208 functions to generate a characterization of an extraction of data from a traffic log. A characterization of an extraction of data from a traffic log can include a log type of a traffic log from which data will be extracted, a direction of traffic represented by data in a traffic log, and/or a data type of data to be extracted from a traffic log. For example, a characterization of an extraction of data from a traffic log can include that the traffic log was created by a server. In another example, a characterization of an extraction of data from a traffic log can include that data to be extracted from a traffic log includes MAC address of destinations to which data is routed from a backend network. Depending upon implementation-specific or other considerations the log data extraction characterization system 208 can determine a characterization of an extraction of data from a traffic log based on input received from a user or an entity. For example, user input can indicate that a user wants to view an amount of data routed by a network device and the log extraction data characterization system 208 can generate a characterization of an extraction of data from a traffic log indicating to extract data showing an amount of data routed by the network device.

The log parsing system 210 functions to generate parsed data of a traffic log by applying a regular expression to the log. The log parsing system 210 can apply a regular expression to a traffic log collected by the log collector system 204. Depending upon implementation-specific or other considerations the log parsing system 210 can apply a regular expression to a traffic log using regular expressions data stored in the regular expressions datastore 206 and a characterization of an extraction of data from a traffic log, as determined by the log data extraction characterization system 208. For example, if regular expressions data specifies to apply a regular expression in generating parsed data for extraction of a specific type of data from a traffic log and the log data extraction characterization system 208 determines to extract data of the specific type, then the log parsing system 210 can use the regular expression to generate parsed data from the traffic log. In another example, if regular expressions data specifies to apply a specific regular expression to a specific type of traffic log, and the log data extraction characterization system 208 characterizes a traffic log as being the specific type, then the log parsing system 210 can apply the specific regular expression to the traffic log.

In a specific implementation, the log parsing system 210 functions to generate and/or update regular expressions data stored in the regular expressions datastore 206. Regular expressions data can be updated by the log parsing system 210 in order to increase an amount of data that is extracted from a traffic log, increase an amount of data that is extracted from a log type of traffic logs, configure for extraction of a direction of data traffic represented in a traffic log, and/or increase a specific type of data to be extracted from a traffic log. The log parsing system 210 can generate and/or update regular expressions data through continued application of regular expressions to traffic logs. For example, the log parsing system 210 can determine that a specific regular expression is better suited for extracting an increased amount of parsed data from a traffic log of a specific type by applying the specific regular expression to traffic logs of the specific type. In another example, the log parsing system 210 can determine that a specific regular expression is better suited for extracting parsed data indicating traffic flow in a specific direction by applying the specific regular expression to traffic logs.

The data extraction system 212 functions to extract data from parsed data of a traffic log by applying a regular expression to the parsed data. The data extraction system 212 can apply a regular expression to parsed data generated by the log parsing system 210. Depending upon implementation-specific or other considerations the data extraction system 212 can apply a regular expression to parsed data using regular expressions data stored in the regular expressions datastore 206 and a characterization of an extraction of data from a traffic log, as determined by the log data extraction characterization system 208. For example, if regular expressions data specifies to apply a regular expression in extracting a specific type of data from parsed data and the log data extraction characterization system 208 determines to extract data of the specific type, then the data extraction system 212 can use the regular expression to extract data from parsed data. In another example, if regular expressions data specifies to apply a specific regular expression to a specific type of traffic log, and the log data extraction characterization system 208 characterizes a traffic log as being the specific type, then the data extraction system 212 can apply the specific regular expression to parsed data generated from the traffic log.

In a specific implementation, the data extraction system 212 functions to generate and/or update regular expressions data stored in the regular expressions datastore 206. Regular expressions data can be updated by the data extraction system 212 in order to increase an amount of data that is extracted from a traffic log, increase an amount of data that is extracted from a log type of traffic logs, configure for extraction of a direction of data traffic represented in a traffic log, and/or increase a specific type of data to be extracted from a traffic log. The data extraction system 212 can generate and/or update regular expressions data through continued application of regular expressions to parsed data generated from traffic logs. For example, the data extraction system 212 can determine that a specific regular expression is better suited for extracting an increased amount of data from parsed data generated from a traffic log of a specific type by applying the specific regular expression to parsed data generated from traffic logs of the specific type. In another example, the data extraction system 212 can determine that a specific regular expression is better suited for extracting data from parsed data indicating traffic flow in a specific direction by applying the specific regular expression to the parsed data.

In an example of operation of the example system shown in FIG. 2, the log collector system 204 collects traffic logs from network devices. In the example of operation of the example system shown in FIG. 2, the log data extraction characterization system 208 characterizes an extraction of data from a traffic log collected by the log collector system 204. Further, in the example of operation of the example system shown in FIG. 2, the log parsing system 210 generates parsed data from the traffic log by applying at least one regular expression to the traffic log based on the characterization of the extraction of data from the traffic log and regular expressions data stored in the regular expressions datastore 206. In the example of operation of the example system shown in FIG. 2, the data extraction system 212 extracts data from parsed data generated from the traffic log by applying at least one regular expression to the parsed data based on the characterization of the extraction of data from the traffic log and regular expressions data stored in the regular expressions datastore 206.

Figure 3:
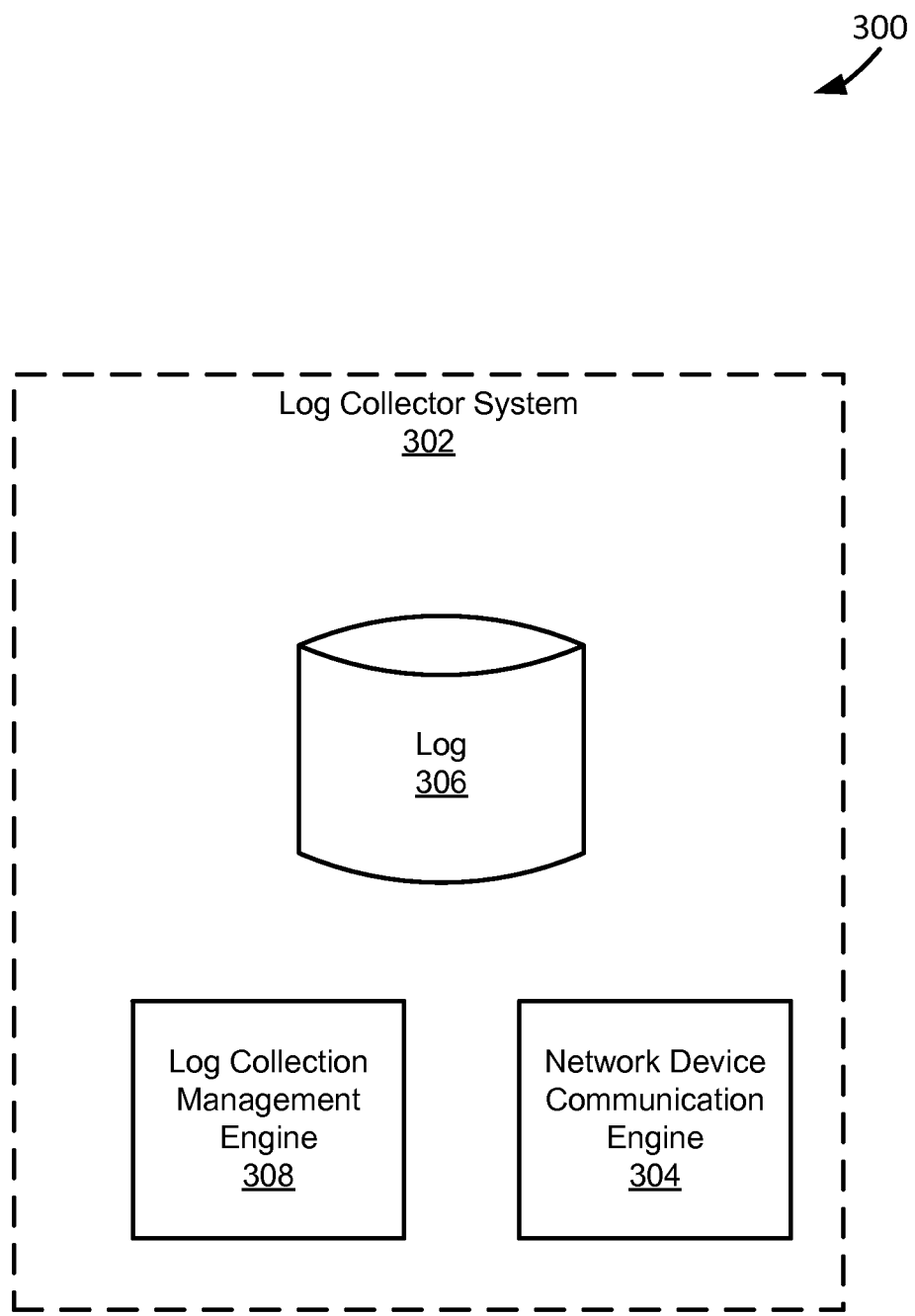
FIG. 3 depicts a diagram of an example of a log collector system.

FIG. 3 depicts a diagram 300 of an example of a log collector system 302. The example log collector system 302 includes a network device communication engine 304, a log datastore 306, and a log collection management engine 308. The log collector system 302 functions according to an applicable system for collecting traffic logs from network devices, such as the log collector systems described in this paper.

The network device communication engine 304 functions to send requests to and receive data from one or a plurality of network devices. The network device communication engine 304 can send requests to and receive data from a network device through a network or a portion of a network. Depending upon implementation-specific or other considerations, the network device communication engine 304 can send requests and receive data through a connection, all or a portion of which can be a wireless connection. The network device communication engine 304 can send a request for a traffic log to a network device and receive a traffic log in response to the request. Received traffic logs can be stored in the log datastore 306.

The log collection management engine 308 functions to manage collection of traffic logs one or a plurality of network devices. In managing collection of traffic logs, the log collection management engine 308 can instruct the network device communication engine 304 to send requests for traffic logs to network devices. The log collection management engine 308 can instruct the network device communication engine 304 to send a request for a traffic log after or during occurrence of a specific event. For example, the log collection management engine 308 can instruct the network device communication engine 304 to send a request for a traffic log after a network device is first coupled to the log collector system 302, when a network device joins a network, and/or a firewall policy of the network device is updated. The log collection management engine 308 can instruct the network device communication engine 304 to send a request for a traffic log at a specific time. For example, the log collection management engine 308 can instruct the network device communication engine 304 to send a request for a traffic log to a network device at the same time every day.

In an example of operation of the example system shown in FIG. 3, the network device communication engine 304 sends a request for a traffic log to a network device. In the example of operation, the network device communication engine 304 receives the traffic log from the network device in response to the request for the traffic log and stores the traffic log in the log datastore 306. Further, in the example of operation of the example system shown in FIG. 3, the log collection management engine 308 instructs the network device communication engine 304 to send the request for the traffic log to the network device.

Figure 4:
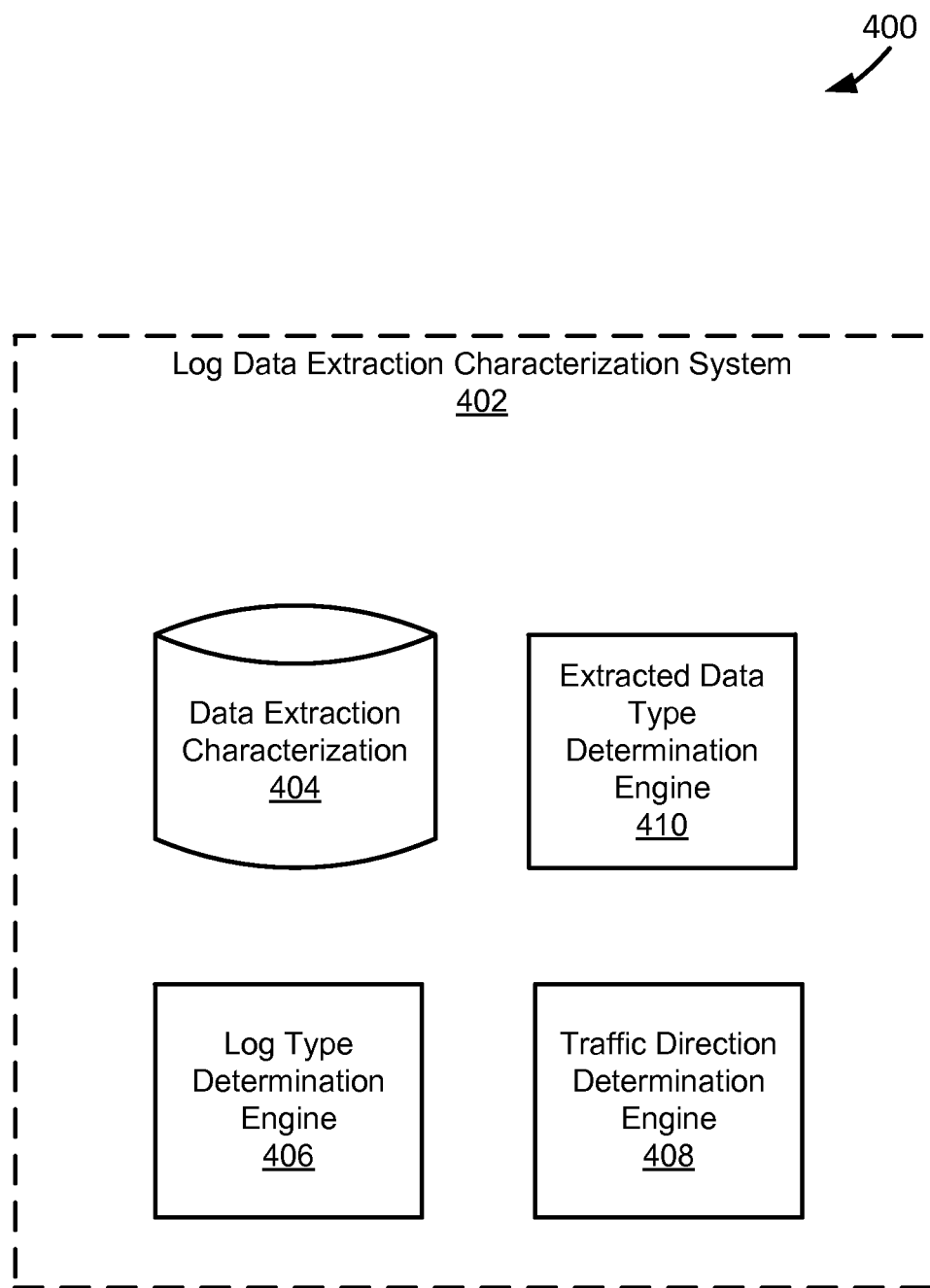
FIG. 4 depicts a diagram of an example log data extraction characterization system.

FIG. 4 depicts a diagram 400 of an example log data extraction characterization system 402. The example log data extraction characterization system 402 includes a data extraction characterization datastore 404, a log type determination engine 406, a traffic direction determination engine 408, and an extracted data type determination engine 410. The example log data extraction characterization system 402 functions according to an applicable system for characterizing the extraction of data from a traffic log, such as the log data extraction characterization systems described in this paper.

The data extraction characterization datastore 404 functions to store data extraction characterization data. Data extraction characterization data includes data indicating a characterization of an extraction of data from a traffic log. For example, data extraction data can indicate a log type of a traffic log from which data will be extracted, a direction of traffic represented by data in a traffic log, and/or a data type of data to be extracted from a traffic log. Data extraction characterization data can be specific to a collected log and/or a network device from which logs are collected.

The log type determination engine 406 functions to determine a log type of a collected traffic log. For example, the log type determination engine 406 can determine that a collected traffic log is an FTP log, an HTTP log, an email log, a syslog, or the like. The log type determination engine 406 can determine a log type of a collected traffic log based on a format of the collected traffic log, and/or data included as part of the traffic log. For example, if a specific string of characters is unique to a specific type of traffic log, and the specific string of characters is present in a collected log, then the log type determination engine 406 can determine that the collected log is the specific type of traffic log.

In a specific implementation, the log type determination engine 406 can generate and/or update data extraction characterization data stored in the data extraction characterization datastore 404. The log type determination engine 406 can generate and/or update data extraction characterization data to indicate a determined log type for a collected traffic log. For example, if the log type determination engine 406 determines that a collected log is an FTP log, then the log type determination engine 406 can generate and/or update data extraction characterization data for the collected log to indicate that the collected log is an FTP log.

The traffic direction determination engine 408 functions to determine a direction of traffic represented by data included in a collected log. For example, the traffic direction determination engine 408 can determine that data in a collected log represents traffic routed from an access point to a client device. The traffic direction determination engine 408 can determine a traffic direction represented by data included in a traffic log based on: data in the traffic log, a networking device the traffic log is received from, a format of the traffic log, a log type of the traffic log, and/or a network of the network device from which the traffic log is received.

In a specific implementation, the traffic direction determination engine 408 can generate and/or update data extraction characterization data stored in the data extraction characterization datastore 404. The traffic direction determination engine 408 can generate and/or update data extraction characterization data to indicate a traffic direction represented by data included in a traffic log. For example, if the traffic direction determination engine 408 determines that data in a collected log represents traffic routed downstream from a server, then the traffic direction determination engine 408 can generate and/or update data extraction characterization data for the collected log to indicate that data in the collected log represents traffic routed downstream from a server.

The extracted data type determination engine 410 functions to determine what data will or can be extracted from a collected log. For example, the extracted data type determination engine 410 can determine that data that will be extracted is a source IP address, a source port, a protocol, and/or a date. The extracted data type determination engine 410 can determine what data will or can be extracted from a collected log based on input received for a user, a log type of the collected log, a traffic direction represented by data in the collected log, and/or a network device from which the log is collected. For example, if user input indicates that the user wants to extract source IP addresses from a collected log, then the extracted data type determination engine 410 can determine that source IP addresses will be extracted from the collected log.

In a specific implementation, the extracted data type determination engine 410 can generate and/or update data extraction characterization data stored in the data extraction characterization datastore 404. The extracted data type determination engine 410 can generate and/or update data extraction characterization data to indicate a type of data that will or can be extracted from the collected log. For example, if the extracted data type determination engine 410 determines that source IP addresses can be extracted from a collected log, then the extracted data type determination engine 410 can generate and/or update data extraction characterization data for the collected log to indicate that source IP address can be extracted from the collected log.

In an example of operation of the example system shown in FIG. 4, the log type determination engine 406 determines a log type of a collected log and updates data extraction characterization data for the collected log to indicate the determined log type. In the example of operation of the example system shown in FIG. 4, the traffic direction determination engine 408 a direction of traffic represented by data included in the collected log and updates the data extraction characterization data for the collected log to indicate the direction of traffic. Further, in the example of operation of the example system shown in FIG. 4, the extracted data type determination engine 410 determines a type of data that can or will be extracted from the collected log and updates the data extraction characterization data for the collected log to indicate the type of data.

Figure 5:
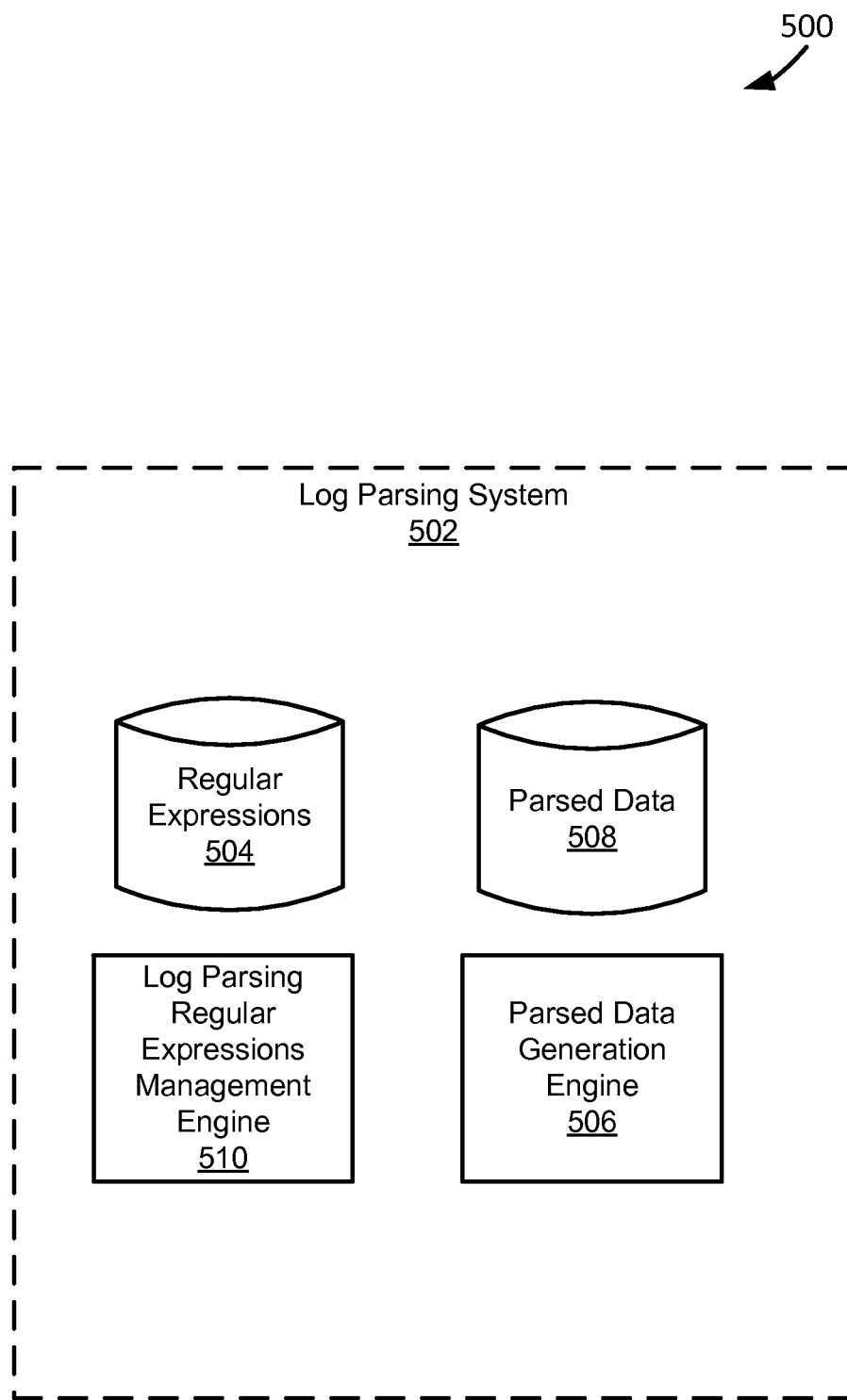
FIG. 5 depicts a diagram of an example log parsing system.

FIG. 5 depicts a diagram 500 of an example log parsing system 502. The example log parsing system 502 includes a regular expressions datastore 504, a parsed data generating engine 506, a parsed data datastore 508, and a log parsing regular expressions management engine 510. The example log parsing system 502 functions according to an applicable system for generating parsed data from a collected traffic log using regular expressions. The example log parsing system 502 can apply regular expressions based on a characterization of an extraction of log data for a collected traffic log, as indicated by data extraction characterization data.

The regular expressions datastore 504 functions according to an applicable datastore for storing regular expressions data, such as the regular expressions datastores described in this paper. Regular expressions data stored in the regular expressions datastore 504 can include a regular expression, an entity responsible for creating a regular expression, log types to apply a specific regular expression to in creating parsed data, parsed data from a traffic log to apply a regular expression to in extracting data, and/or types of data extracted by applying a regular expression to either a traffic log or parsed data.

The parsed data generation engine 506 functions to generated parsed data by applying regular expressions to a collected traffic log. The parsed data generation engine 506 can apply regular expressions to a traffic log according to a regular expressions data and a characterization of an extraction of log date for the traffic log. For example, if a characterization of an extraction identifies a collected log as a syslog and regular expressions data indicates that a specific regular expression generates an increased amount of relevant parse data from syslogs, then the parsed data generation engine 506 can apply the specific regular expression to the collected log to generate parsed data. In another example, if a characterization of an extraction identifies that source IP addresses should be extracted from a collected log and regular expressions data indicates a specific regular expression generates parsed data for extracting source IP addresses, then the parsed data generation engine 506 can apply the specific regular expression to the collected log.

In a specific implementation, the parsed data generation engine 506 functions to apply a plurality of regular expressions to a collected traffic log to generate a plurality of groups of generated parsed data. The parsed data generation engine 506 can apply a plurality of regular expressions to a collected traffic log to determine which regular expression generates the largest amount of parsed data, and subsequently use a group of generated parsed data that has the greatest amount of parsed data. Depending upon implementation-specific or other considerations, the parsed data generation engine 506 can apply a plurality of regular expressions to a collected traffic log until a group of parsed data is created that includes an amount of parsed data above a threshold amount.

The parsed data datastore 508 functions to store parsed data generated by the parsed data generation engine 506 from collected logs. Parsed data stored in the parsed data datastore 508 can be stored with indicators identifying a collected log from which the parsed data was generated, a date and time when the parsed data was generated, and regular expressions used to generate the parse data.

The log parsing regular expression management engine 510 functions to manage regular expressions used in generating parsed data from a collected log. In managing regular expressions, the log parsing regular expression management engine 510 can generate and/or update regular expressions data stored in the regular expressions datastore 504. For example, the log parsing regular expressions management engine 510 can generate a regular expression to apply to a collected log and add it to the regular expressions data. Depending upon implementation-specific or other considerations, the regular expressions datastore 504 can start out not storing any regular expressions or storing a generic set of regular expressions, after which the log parsing regular expression management engine 510 can add regular expressions and/or modify regular expressions over time. In various implementations, the log parsing regular expressions management engine 510 can be configured to only manage regular expressions data for regular expressions used in generating parsed data from a collected traffic log.

In a specific implementation, the log parsing regular expressions management engine 510 can manage regular expressions based on parsed data generated by the parsed data generation engine 506. In various implementations, the log parsing regular expression management engine 510 can create new regular expressions or modify regular expressions based on parsed data generated by the parsed data generation engine 506. The log parsing regular expression management engine 510 can manage regular expression based on an amount of parsed data generated, a quality of generated parsed data, and/or an amount of regular traffic included in generated parsed data. For example, if parsed data generated from a traffic log by using a specific regular expression includes a large amount of regular traffic, as can be indicated by a Gaussian distribution, then the log parsing regular expressions management engine 510 can update regular expressions data to indicate that the specific regular expression should be applied to logs of the same type as the traffic log. In another example, if no parsed data is generated by applying a specific regular expression to a traffic log, then the log parsing regular expressions management engine 510 can update regular expressions data to indicate that the specific regular expression should not be applied to logs of the same type as the traffic log and/or to modify the specific regular expression.

In a specific implementation, the log parsing regular expressions management engine 510 can manage regular expressions used in generating parsed data from a collected log based on data extraction from parsed data. In various implementations, the log parsing regular expression management engine 510 can create new regular expressions or modify regular expressions based on data extracted from parsed data. The log parsing regular expression management engine 510 can manage regular expression based on an amount of data extracted from generated parsed data, a quality of data extracted from generated parsed data, and/or an amount of regular traffic included in data extracted from generated parsed data. For example, if a large amount of desired data is extracted from parsed data generated from a traffic log using a specific regular expression, then the log parsing regular expression management engine 510 can update regular expressions data to indicate that the specific regular expression should be applies to logs of the same type as the traffic log. In another example, if no data is extracted from parsed data generated by applying a specific regular expression to a traffic log, then the log parsing regular expressions management engine 510 can update regular expressions data to indicate that the specific regular expression should not be applied to logs of the same type as the traffic log and/or to modify the specific regular expression.

In an example of operation of the example system shown in FIG. 5, the parsed data generation engine 506 applies a regular expression to a collected log to generate parsed data. In the example of operation of the example system shown in FIG. 5, the parsed data generation engine 506 applies the regular expression based on a characterization of an extraction of data from the collected log and regular expressions data stored in the regular expressions datastore 504. Further in the example of operation, the log parsing regular expressions management engine 510 manages regular expressions data stored in the regular expressions datastore 504 based on generated parsed data and data extracted from the generated parsed data.

Figure 6:
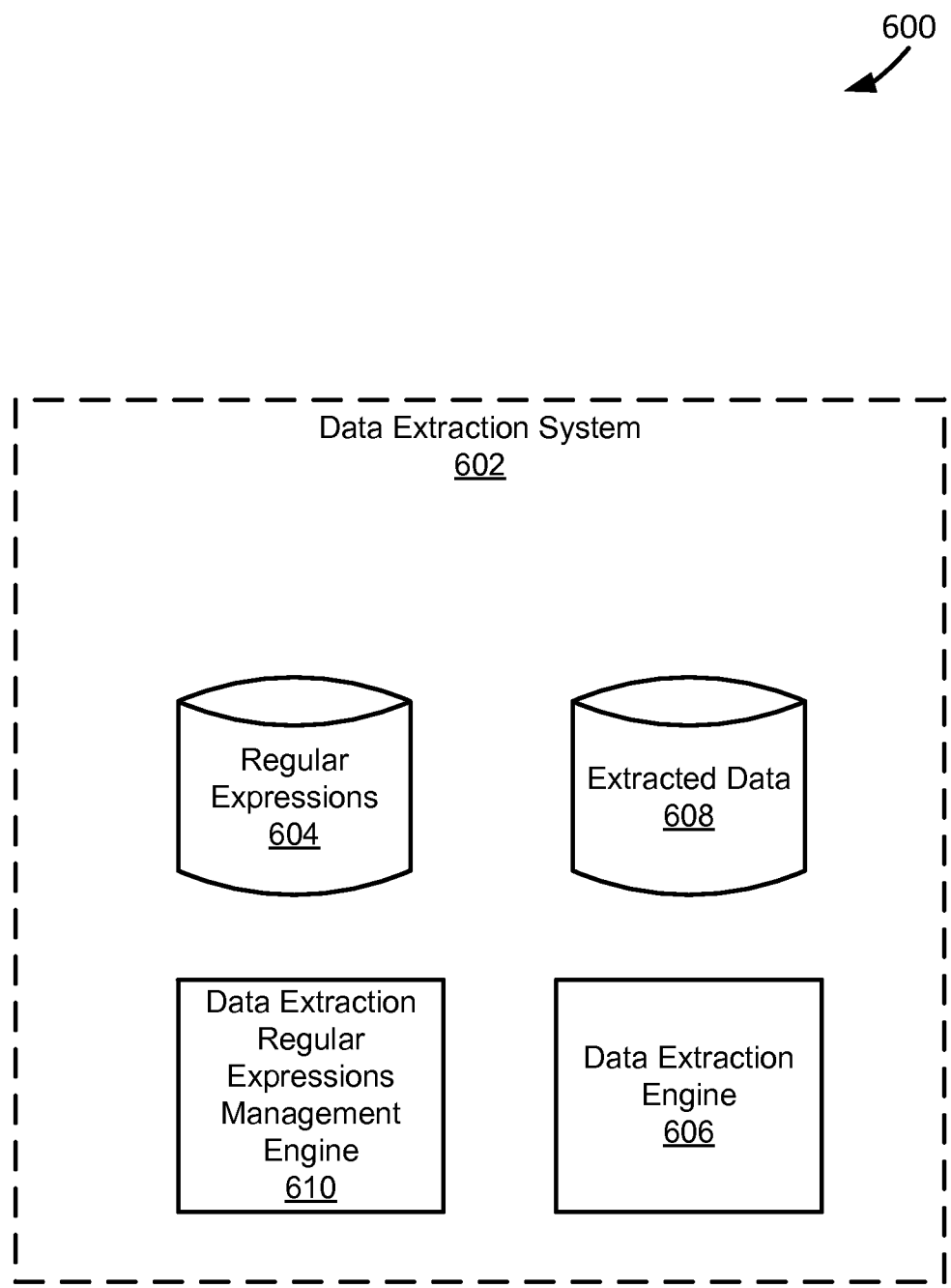
FIG. 6 depicts a diagram of an example data extraction system.

FIG. 6 depicts a diagram 600 of an example data extraction system 602. The example data extraction system 602 includes a regular expressions datastore 604, a data extraction engine 606, an extracted data datastore 608, and a data extraction regular expressions management engine 610. The example data extraction system 602 functions according to an applicable system for extracting data from parsed data generated from a collected traffic log using regular expressions. The example data extraction system 602 can apply regular expressions based on a characterization of an extraction of log data for a collected traffic log, as indicated by data extraction characterization data.

The regular expressions datastore 604 functions according to an applicable datastore for storing regular expressions data, such as the regular expressions datastores described in this paper. Regular expressions data stored in the regular expressions datastore 604 can include a regular expression, an entity responsible for creating a regular expression, log types to apply a specific regular expression to in creating parsed data, parsed data from a traffic log to apply a regular expression to in extracting data, and/or types of data extracted by applying a regular expression to either a traffic log or parsed data.

The data extraction engine 606 functions to extract data from parsed data generated from a collected log by applying regular expressions to the parsed data. The data extraction engine 606 can apply regular expressions to parsed data according to a regular expressions data and a characterization of an extraction of log date for a traffic log from which the parsed data is generated. For example, if a characterization of an extraction identifies a collected log as a syslog and regular expressions data indicates that a specific regular expression extracts an increased amount of relevant data from parsed data of syslogs, then the data extraction engine 606 can apply the specific regular expression to parsed data generated from the collected log. In another example, if a characterization of an extraction identifies that source IP addresses should be extracted from a collected log and regular expressions data indicates a specific regular expression extracts source IP addresses from parsed data, then the data extraction engine 606 can apply the specific regular expression to parsed data generated from the collected log.

In a specific implementation, the data extraction engine 606 functions to apply a plurality of regular expressions to parsed data to extract different groups of data from the parsed data. The data extraction engine 606 can apply a plurality of regular expressions to parsed data to determine which regular expression leads to the largest amount of data in a group, and subsequently use the group with the largest amount of extracted data. Depending upon implementation-specific or other considerations, the data extraction engine 606 can apply a plurality of regular expressions to parsed data until a group of data is extracted that includes an amount of extracted data above a threshold amount.

In a specific implementation, the data extraction engine 606 functions to substitute data in either or both collected traffic logs and parsed data generated from the collected traffic logs. The data extraction engine 606 can substitute irrelevant data with useful data in either or both collected traffic logs and parsed data, before applying a regular expression to extract data. For example, the data extraction engine 606 can substitute an ASCII name with an IP address.

The extracted data datastore 608 functions to store data extracted by the data extraction engine 606 from parsed data of collected traffic logs. Extracted data stored in the extracted data datastore 608 can be stored with indicators identifying a collected log from which the data was extracted, a date and time when the data was extracted, and regular expressions used to extract the data.

The data extraction regular expression management engine 610 functions to manage regular expressions used in extracting data from parsed data of a collected log. In managing regular expressions, the data extraction regular expression management engine 610 can generate and/or update regular expressions data stored in the regular expressions datastore 604. For example, the data extraction regular expressions management engine 610 can generate a regular expression to apply to parsed data of a collected log and add it to the regular expressions data. Depending upon implementation-specific or other considerations, the regular expressions datastore 604 can start out not storing any regular expressions or storing a generic set of regular expressions, after which the data extraction regular expression management engine 610 can add regular expressions and/or modify regular expressions over time. In various implementations, the data extraction regular expressions management engine 610 can be configured to only manage regular expressions data for regular expressions used in extracting data from parsed data of a collected traffic log.

In a specific implementation, the data extraction regular expressions management engine 610 can manage regular expression based on data extracted by the data extraction engine 606. In various implementations, the data extraction regular expression management engine 610 can create new regular expressions or modify regular expressions based on data extracted by the data extraction engine 606. The data extraction regular expression management engine 610 can manage regular expression based on an amount of data extracted, a quality of extracted data, and/or an amount of regular traffic included in extracted data. For example, if data extracted from parsed data of a traffic log by using a specific regular expression includes a large amount of regular traffic, as can be indicated by a Gaussian distribution, then the data extraction regular expressions management engine 610 can update regular expressions data to indicate that the specific regular expression should be applied to parsed data of logs of the same type as the traffic log. In another example, if no data is extracted by applying a specific regular expression to parsed data of a traffic log, then the data extraction regular expressions management engine 610 can update regular expressions data to indicate that the specific regular expression should not be applied to parsed data of logs of the same type as the traffic log and/or to modify the specific regular expression.

In an example of operation of the example system shown in FIG. 6, the data extraction engine 606 applies a regular expression extract data from parsed data of a collected traffic log. In the example of operation of the example system shown in FIG. 6, the data extraction engine 606 applies the regular expression based on a characterization of an extraction of data from the collected traffic log and regular expressions data stored in the regular expressions datastore 604. Further in the example of operation, the data extraction regular expressions management engine 610 manages regular expressions data stored in the regular expressions datastore 604 based on data extracted from the parsed data by the data extraction engine 606.

Figure 7:
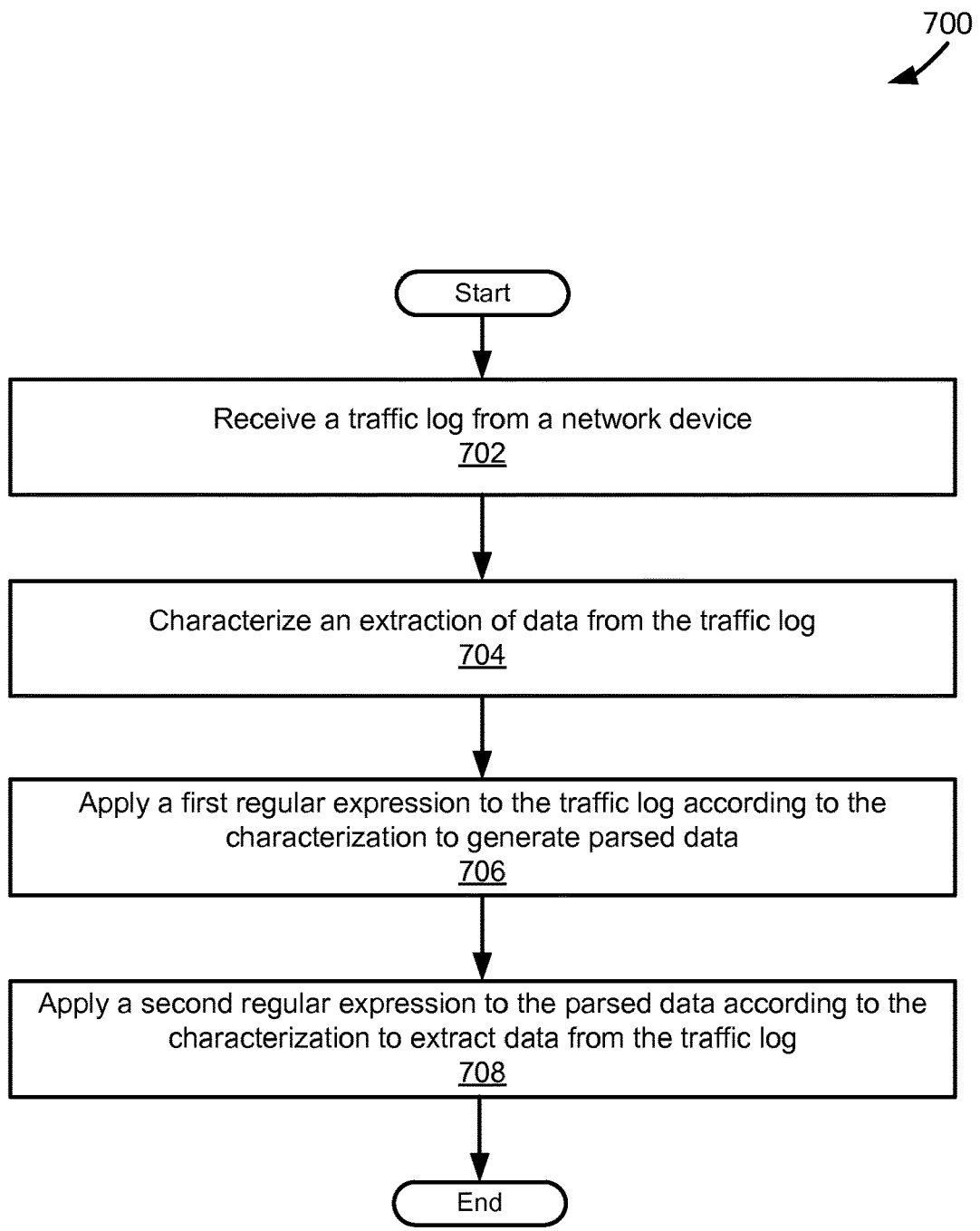
FIG. 7 depicts a flowchart of an example of a method for extracting data from a traffic log using regular expressions.

FIG. 7 depicts a flowchart 700 of an example of a method for extracting data from a traffic log using regular expressions. The flowchart 700 begins at module 702, where a traffic log is received from a network device. A traffic log can be received by a log collector system from a network device through a network device communication engine. A traffic log can be received after a request for a traffic log is sent to a network device. In various implementations, a traffic log can be received at a specific time, after a network device first connects to a network, and/or if a firewall is updated.

The flowchart 700 continues to module 704, where an extraction of data from the traffic log is characterized. A log data extraction characterization system can characterize an extraction of data from the traffic log. A characterization of an extraction of data from the traffic log can include a log type of the traffic log from which data will be extracted, a direction of traffic represented by data in the traffic log, and/or a data type of data to be extracted from the traffic log. A characterization of an extraction of data from the traffic log can be determined based, at least in part, on input from a user. For example, if a user wants to extract source IP addresses from the traffic log, then a characterization of an extraction of data from the traffic log can include that source IP addresses will be extracted from the traffic log.

The flowchart 700 continues to module 706, where a first regular expression is applied to the traffic log according to the characterization of the extraction of data from the traffic log. A parsed data generation engine can apply a first regular expression according to the characterization of the extraction of data from the traffic log. The first regular can be selected and applied based on regular expressions data and the characterization of the extraction of data from the traffic log. For example, if regular expressions data indicates that the first regular expression should be used to generate parsed data from a syslog, and the characterization of the extraction of data from the traffic log indicates that the traffic log is a syslog, then the first regular expression can be chosen and applied according to the regular expressions data.

The flowchart 700 continues to module 708, where a second regular expression is applied to the parsed data in order to extract data the traffic log according to the characterization of the extraction of data from the traffic log. A data extraction engine can apply a second regular expression according to the characterization of the extraction of data from the traffic log. The second regular can be selected and applied based on regular expressions data and the characterization of the extraction of data from the traffic log. For example, if regular expressions data indicates that the second regular expression should be used to extract data indicating IP source addresses from the parsed data of the traffic log, and the characterization of the extraction of data from the traffic log indicates that data indicating IP source addresses is to be extracted from the traffic log, then the second regular expression can be chosen and applied according to the regular expressions data.

Figure 8:
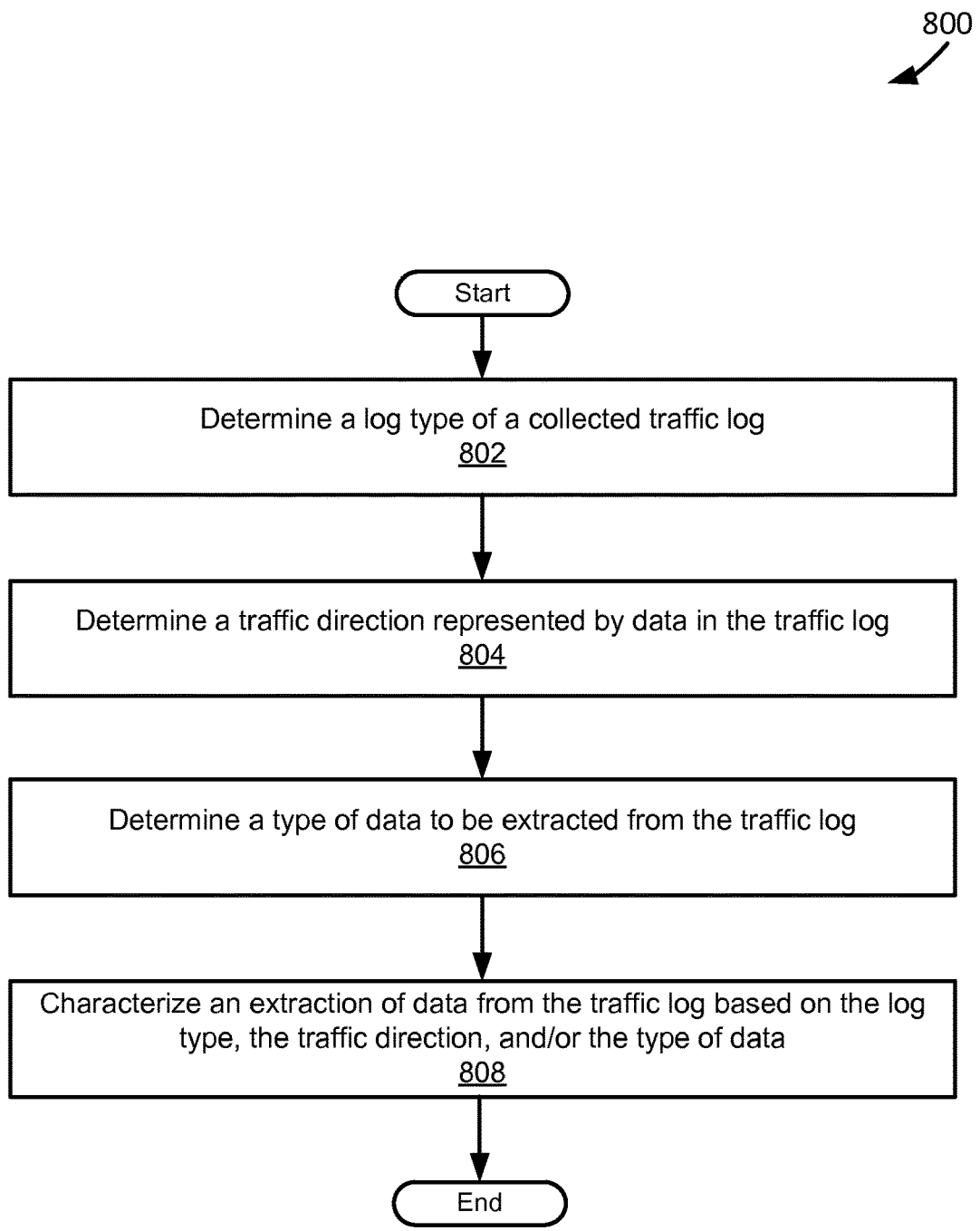
FIG. 8 depicts a flowchart of an example of a method for characterizing an extraction of data from a traffic log.

FIG. 8 depicts a flowchart 800 of an example of a method for characterizing an extraction of data from a traffic log. The flowchart 800 begins at module 802, where a log type of a collected traffic log is determined. A log type determination engine can function to determine a log type of the collected traffic log. A log type of the collected traffic log based on a format of the collected traffic log, and/or data included as part of the traffic log.

The flowchart 800 continues to module 804, where a traffic direction represented by data in the traffic log is determined. A traffic direction determination engine can determine a direction of traffic represented by data in the traffic log. A traffic direction represented by data included in the traffic log can be determined based on: data in the traffic log, a networking device the traffic log is received from, a format of the traffic log, a log type of the traffic log, and/or a network of the network device from which the traffic log is received.

The flowchart 800 continues to module 806, where a type of data to be extracted from the traffic log is determined. An extracted data type determination engine can determine a type of traffic to be extracted from the traffic log. A type of data to be extracted from the traffic log can be determined based on input received for a user, a log type of the collected log, the traffic direction represented by data in the collected log, and/or a network device from which the log is collected.

The flowchart 808 continues to module 808, where an extraction of data from the traffic log is characterized based on the determined log type, the determined traffic direction, and/or the determined type of data to be extracted from the traffic log. A log data extraction characterization system can characterize an extraction of data from the data log. A characterization of an extraction of data from the traffic log can be used in actually extracting data from the traffic log using regular expressions.

Figure 9:
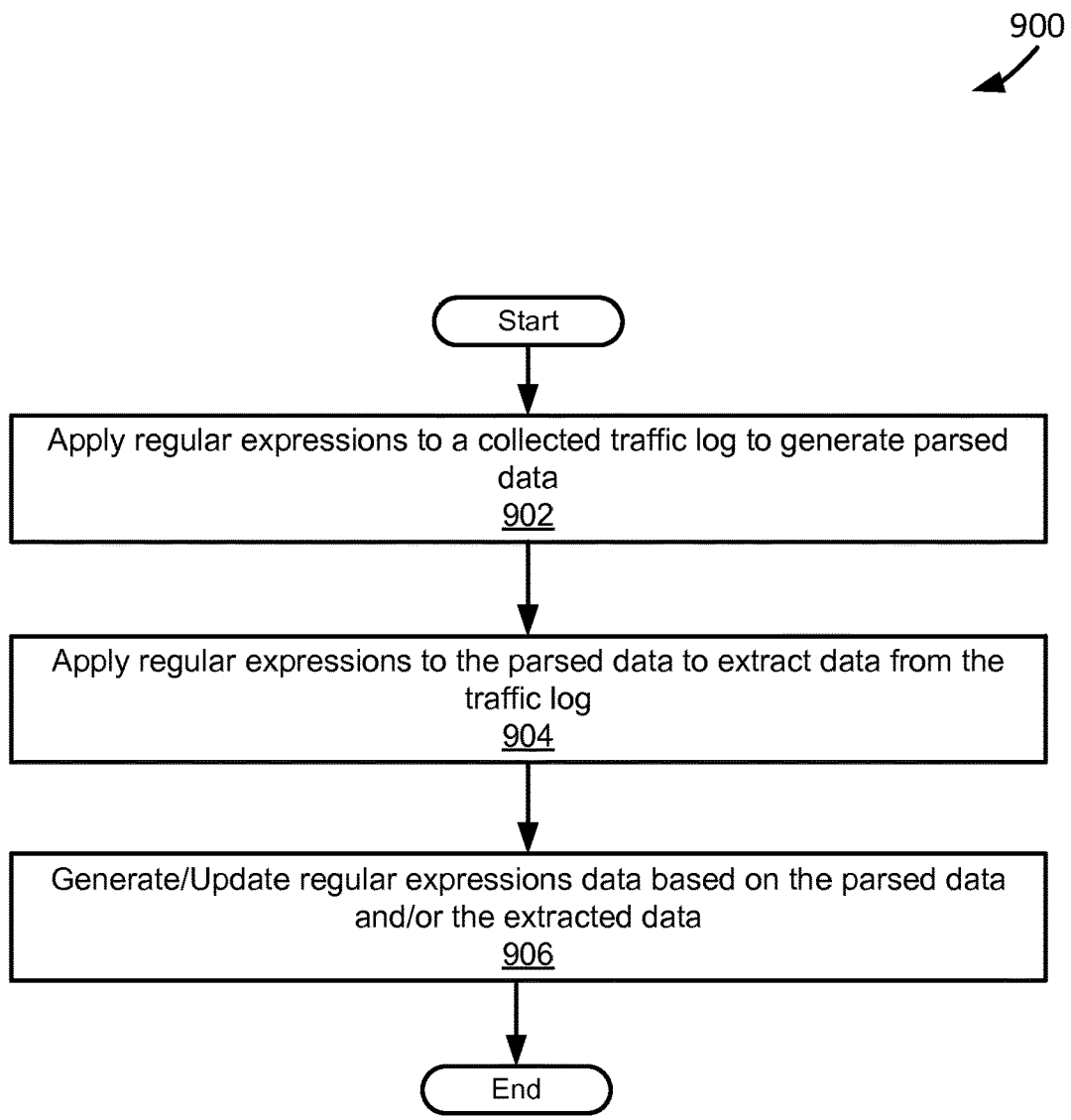
FIG. 9 depicts a flowchart of an example of a method for generating/updating regular expressions data for use in extracting data from logs using regular expressions.

FIG. 9 depicts a flowchart 900 of an example of a method for generating/updating regular expressions data for use in extracting data from logs using regular expressions. The flowchart 900 begins at module 902, where regular expressions are applied to a collected traffic log to generate parsed data. A parsed data generation engine can apply regular expressions to the collected traffic log. Regular expressions can be applied to the collected traffic log in accordance with a characterization of an extraction of data from the collected traffic log and/or regular expressions data.

The flowchart 900 continues to module 904, where regular expressions are applied to the parsed data to extract data from the traffic log. A data extraction engine can apply regular expressions to the parsed data of the traffic log. Regular expressions can be applied to the parsed data of the traffic log in accordance with a characterization of an extraction of data from the collected traffic log and/or regular expressions data.

The flowchart 900 continues to module 906, where the regular expressions data is generated/updated based on the parsed data and/or the extracted data. A log parsing regular expressions management engine and/or a data extraction regular expressions management engine can generate/update the regular expressions data. Regular expression data identifying regular expressions, log types to apply a specific regular expression to in creating parsed data, parsed data from a traffic log to apply a regular expression to in extracting data, and/or types of data obtained by applying a regular expression can be added or updated.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

The invention claimed is:

1. A method comprising:
   detecting an initial connection of a network device;
   sending a request, in response to detecting the initial connection of the network device, for a traffic log from the network device;
   receiving, in response to the request, the traffic log from the network device;
   selecting a first regular expression from a plurality of regular expressions based on a characterization of an extraction of data from the traffic log, the characterization based on a traffic direction represented by data in the traffic log;
   parsing the traffic log by applying the first regular expression to the traffic log according to the characterization of the extraction of data from the traffic log to generate parsed data;
   selecting a second regular expression from the plurality of regular expressions based on the characterization of the extraction of data from the traffic log, the second regular expression configured to generate a largest amount of relevant extracted data, compared to the plurality of regular expressions, when applied to the parsed data;
   extracting data from the traffic log by applying the second regular expression to the parsed data according to a characterization of the extraction of data from the traffic log to generate extracted data.

2. The method of claim 1, wherein the traffic log is received from the network device after a firewall policy of a network associated with the network device is changed.

3. The method of claim 1, further comprising parsing the traffic log by applying a plurality of regular expressions, including the first regular expression, to the traffic log according to the characterization of the extraction of data from the traffic log until an amount of the parsed data reaches a threshold amount.

4. The method of claim 1, further comprising extracting the data from the traffic log by applying a plurality of regular expressions, including the first regular expression, to the parsed data according to the characterization of the extraction of data from the traffic log until an amount of the extracted data reaches a threshold amount.

5. The method of claim 1, further comprising updating regular expressions data indicating a specific regular expression to apply according to specific characterizations of extractions of data from traffic logs based on an amount of relevant data of the extracted data.

6. The method of claim 1, further comprising updating regular expressions data indicating a specific regular expression to apply according to specific characterizations of extractions of data from traffic logs based on an amount of relevant data of the parsed data.

7. The method of claim 1, further comprising updating regular expressions data indicating a specific regular expression to apply according to specific characterizations of extractions of data from traffic logs by modifying generic regular expressions based on an amount of relevant data of the extracted data to create the specific regular expression.

8. The method of claim 1, wherein the traffic log is received from the network device when the network device joins a network.

9. The method of claim 1, wherein the traffic log is received from the network device after the network device is coupled to a log collector system.

10. A system comprising:
    one or more processors; and
    memory storing instructions that, when executed by the one or more processors, cause the system to perform:
      detecting an initial connection of a network device;
      sending a request, in response to detecting the initial connection of the network device, for a traffic log from the network device;
      receiving, in response to the request, the traffic log from the network device;
      selecting a first regular expression from a plurality of regular expressions based on a characterization of an extraction of data from the traffic log, the characterization based on a traffic direction represented by data in the traffic log;
      parsing the traffic log by applying the first regular expression to the traffic log according to the characterization of the extraction of data from the traffic log to generate parsed data;
      selecting a second regular expression from the plurality of regular expressions based on the characterization of the extraction of data from the traffic log, the second regular expression configured to generate a largest amount of relevant extracted data, compared to the plurality of regular expressions, when applied to the parsed data;
      extracting data from the traffic log by applying the second regular expression to the parsed data according to a characterization of the extraction of data from the traffic log to generate extracted data.

11. The system of claim 10, wherein the traffic log is received from the network device after a firewall policy of a network associated with the network device is changed.

12. The system of claim 10, wherein the instructions further cause the system to perform parsing the traffic log by applying a plurality of regular expressions, including the first regular expression, to the traffic log according to the characterization of the extraction of data from the traffic log until an amount of the parsed data reaches a threshold amount.

13. The system of claim 10, wherein the instructions further cause the system to perform extracting the data from the traffic log by applying a plurality of regular expressions, including the first regular expression, to the parsed data according to the characterization of the extraction of data from the traffic log until an amount of the extracted data reaches a threshold amount.

14. The system of claim 10, wherein the instructions further cause the system to perform updating regular expressions data indicating a specific regular expression to apply according to specific characterizations of extractions of data from traffic logs based on an amount of relevant data of the extracted data.

15. The system of claim 10, wherein the instructions further cause the system to perform updating regular expressions data indicating a specific regular expression to apply according to specific characterizations of extractions of data from traffic logs based on an amount of relevant data of the parsed data.

16. The system of claim 10, wherein the instructions further cause the system to perform updating regular expressions data indicating a specific regular expression to apply according to specific characterizations of extractions of data from traffic logs by modifying generic regular expressions based on an amount of relevant data of the extracted data to create the specific regular expression.

17. The system of claim 10, wherein the traffic log is received from the network device when the network device joins a network.

18. The system of claim 10, wherein the traffic log is received from the network device after the network device is coupled to a log collection management engine.

19. A system comprising:
- means for detecting an initial connection of a network device;
- means for sending a request, in response to detecting the initial connection of the network device, for a traffic log from the network device;
- means for receiving, in response to the request, the traffic log from the network device;
- means for selecting a first regular expression from a plurality of regular expressions based on a characterization of an extraction of data from the traffic log, the characterization based on a traffic direction represented by data in the traffic log;
- means for parsing the traffic log by applying the first regular expression to the traffic log according to the characterization of the extraction of data from the traffic log to generate parsed data;
- means for selecting a second regular expression from the plurality of regular expressions based on the characterization of the extraction of data from the traffic log, the second regular expression configured to generate a largest amount of relevant extracted data, compared to the plurality of regular expressions, when applied to the parsed data;
- means for extracting data from the traffic log by applying the second regular expression to the parsed data according to a characterization of the extraction of data from the traffic log to generate extracted data.

20. The system of claim 19, wherein the traffic log is received from the network device when the network device joins a network.

* * * * *